(12) United States Patent
Watson et al.

(10) Patent No.: US 8,842,906 B2
(45) Date of Patent: Sep. 23, 2014

(54) BODY MEASUREMENT

(75) Inventors: Eleanor Watson, Birmingham (GB);
David Evans, Birmingham (GB)

(73) Assignee: Poikos Limited, Birmingham (GB)

(*) Notice: Subject to any disclaimer, the term of this patent is extended or adjusted under 35 U.S.C. 154(b) by 0 days.

(21) Appl. No.: 13/569,504

(22) Filed: Aug. 8, 2012

(65) Prior Publication Data

US 2013/0315470 A1 Nov. 28, 2013

(51) Int. Cl.
*G06K 9/00* (2006.01)

(52) U.S. Cl.
CPC .................................. *G06K 9/00* (2013.01)
USPC ........... 382/154; 382/107; 382/153; 382/162; 382/173; 382/249

(58) Field of Classification Search
CPC .............. A61B 1/00147; G01S 2007/2883; G06T 2207/20076; G06T 9/001; G06T 7/0034; G06T 7/0087; G06T 7/401; G06K 9/00234; G06K 9/6296; G06K 9/6297; G06K 9/00624; G06F 3/033
USPC .................. 382/107, 153, 154, 162, 173, 249
See application file for complete search history.

(56) References Cited

U.S. PATENT DOCUMENTS

| 5,680,528 | A  | * | 10/1997 | Korszun ..................... 345/630 |
| 6,324,309 | B1 | * | 11/2001 | Tokuyama et al. ........... 382/300 |
| 7,623,625 | B2 | * | 11/2009 | Boyden et al. ................ 378/86 |
| 2003/0118246 | A1 | * | 6/2003 | August ....................... 382/260 |
| 2004/0013295 | A1 | * | 1/2004 | Sabe et al. .................. 382/153 |
| 2004/0133927 | A1 | * | 7/2004 | Sternberg et al. ............ 725/136 |
| 2008/0004904 | A1 | * | 1/2008 | Tran ................................ 705/2 |
| 2009/0164213 | A1 | * | 6/2009 | Lennington et al. .......... 704/231 |
| 2010/0119135 | A1 | * | 5/2010 | Coupe et al. ................. 382/131 |
| 2010/0303302 | A1 | * | 12/2010 | Kipman et al. .............. 382/107 |

* cited by examiner

*Primary Examiner* — Vu Le
*Assistant Examiner* — Aklilu Woldemariam
(74) *Attorney, Agent, or Firm* — Fish & Richardson P.C.

(57) ABSTRACT

A method of generating three dimensional body data of a subject is described. The method includes capturing one or more images of the subject using a digital imaging device and generating three dimensional body data of the subject based on the one or more images.

31 Claims, 5 Drawing Sheets

BODY MEASUREMENT

CLAIM OF PRIORITY

Pursuant to 35 USC §120, this application claims the benefit of United Kingdom Application No. GB1209382.9 filed May 25, 2012 and titled "Body Measurement", the contents of which is hereby incorporated by reference in its entirety

TECHNICAL FIELD

The present disclosure relates to a method and system for determining body measurements using images of the body.

BACKGROUND

Conventional body scanners and body measurement devices rely on high resolution depth sensors, fixed patterns of light or known camera angles to generate three dimensional images of the human body. Such techniques require specialist equipment and present a high burden on the user who is required to travel to specialised centres for such body measurement.

SUMMARY

The present disclosure relates to a method and system for determining body measurements using images of the body. More specifically, the present disclosure describes a method and system for generating three dimensional body image data of a subject by comparison to a database of existing known three dimensional models to obtain a best mapping. From this mapping, body shape specific data can be determined, including measurements.

DETAILED DESCRIPTION

Figure 1:
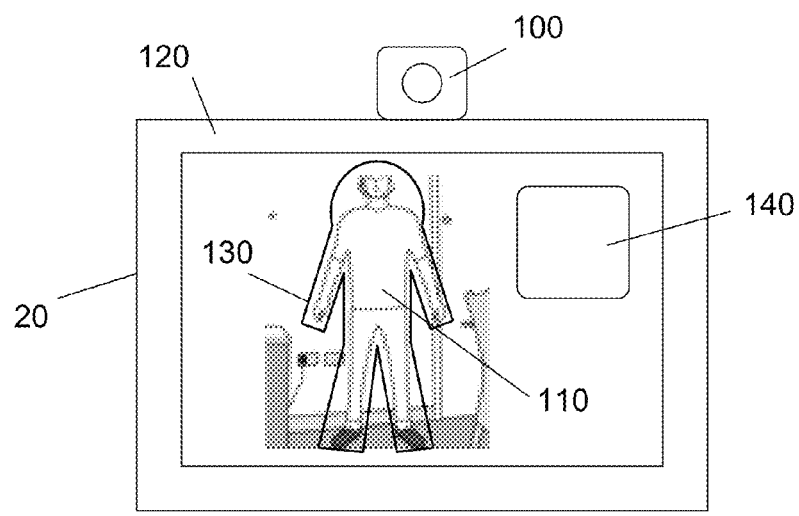
FIG. 1 is a schematic overview of a system.
Figure 1:
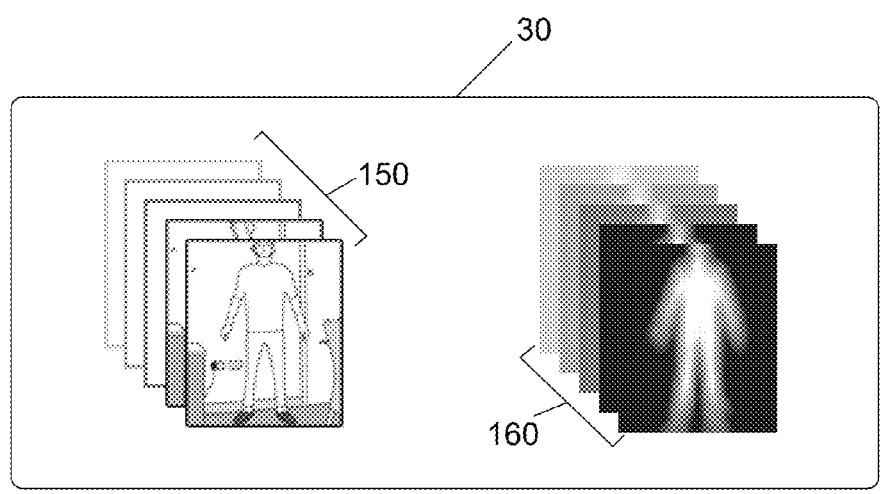

The present disclosure relates to a method and system for determining body measurements using images of the body. More specifically, the present disclosure describes a method and system for generating three dimensional body image data of a subject by comparison to a database of existing known three dimensional models to obtain a best mapping. From this mapping, body shape specific data can be determined, including measurements.

Obtaining accurate three dimensional body measurement data is particularly beneficial in the medical field and may be used, for example, to monitor changes in body volume that may occur as a result of medical conditions, for example renal failure. By assessing the changes in the patient's body images, it is possible to determine factors such as water retention and surgery success. Indeed, with the rise of telemedicine, the need to monitor and provide information about body measurements is likely to grow.

Furthermore, being able to generate accurate body characterisation and measurement is also of particular interest in the clothing industry. It can be appreciated that being able to provide a clothing manufacturer or retailer with accurate body dimensions would be beneficial to both the person seeking clothes and the companies involved in the supply of clothes, this is particularly beneficial for online purchases.

Current methods and devices for providing such measurements are either large and expensive, and/or require the use of complex equipment including detectors capable of determining the depth or distance of the subject relative to a reference point. As a result they do not allow subjects, such as private individuals and patients, to monitor their three dimensional body shape easily or at home. Being able to provide a three dimensional body image simply, without using dedicated complex body scanners is therefore desirable.

A method of generating three dimensional body data of a subject is described herein. The method includes:

i) capturing one or more images of the subject using a digital imaging device;

ii) partitioning the one or more images into a plurality of segments;

iii) analysing the segments of the one or more images to determine the probability that the subject is located in the segment;

iv) identifying one or more distributions within the or each partitioned image, each distribution relating to a property of the one or more images;

v) utilising the probabilities and the distribution data to produce one or more unique probability maps representing the subject;

vi) comparing the one or more unique probability maps with a database of representations of three dimensional bodies to determine a best mapping between the or each unique probability maps and the database; and vii) generating three dimensional body data of the subject based on the best mapping.

The methods and systems described herein allow for data representative of the three dimensional body image of a subject to be generated cheaply and easily based on 2 dimensional images obtainable from a webcam, cameraphone or other camera. Additionally, because dedicated imaging equipment is not necessary, a subject can easily update their generated three dimensional body image allowing changes to their body shape to be easily tracked and monitored.

Generally, identifying one or more distributions within the or each partitioned image, where each distribution relates to a property of the one or more images can include weighting pixels in the or each image according to the probability that a pixel represents the subject in the image to generate a corresponding weighted image. Within these weighted images, one ore more colour and/or spatial distributions can be identified.

Furthermore, one or more probability maps can be provided that identify the expected shape and pose of the subject in the one or more images. Typically, the probability maps are pre-rendered probability maps stored on the server either generated from earlier images and/or obtained from a pre-existing database of probability maps. For example, if the subject poses in the images to present their left and right side profiles, the probability maps provided are representative of the respective profile. In this case, an image with a subject posing in a left side profile pose can be compared to a left side profile probability map.

The one or more probability maps can also be provided based on the determined pose of the subject. The pose of the subject can be determined by feature tracking the subject to identify the pose of the subject. A typical method of feature tracking utilises Lucas-Kanade Pyramids to calculate the optical flow of keypoints of the subject between images (or frames if applied to video). By taking a frame where the subject's position is known, key points in the image can be located (for example using corner detection techniques). Such points may be fingers, patterns on clothing, tattoos, skin blemishes etc.). A Lucas-Kanade Pyramid technique can then be used to follow these points between frames (or images). The points may be rechecked every few frames to prevent slippage. Such a technique allows the pose of the subject within images to be guessed more accurately and further allows the one or more probability maps to be provided based on the determined pose. Such a pose determination technique increases the flexibility of the system and is particularly useful for determining the pose of subjects from video.

Embodiments may compare the one or more unique probability maps with a database of three dimensional body representations to determine a best mapping and/or may also generate an average three dimensional body image from a known database of three dimensional body representations (or may load a pre-existing average three dimensional body representation from a database of such representations). The three dimensional body representations are typically obtained from empirical data collected from dedicated body scanners. Such representations may include three dimensional body measurements and/or scans. The determination of the best mapping between the unique probability map and the three dimensional body representation is typically the three dimensional representation that has the highest percentage overlap when compared to the unique probability map.

From this average three dimensional body image, it is possible to generate a number of silhouettes in different orientations, representing different poses, of the average three dimensional body image. Once the silhouette has been generated, it can then be compared against the unique probability map of the subject to determine the degree of match between the unique probability map and the silhouette. As with the degree of best mapping, determination of the degree of match is typically a determination as to which silhouette has the greatest percentage overlap with the unique probability map.

In one embodiment, a predefined series of vectors that define how the average three dimensional body image can be altered can also be used. The predefined series of vectors can be applied to the average three dimensional body image to generate a series of modified silhouettes, each modified silhouette typically being a small variation of the original silhouette. By comparing the modified silhouette with the unique probability map of the subject a degree of match with the unique probability map can be generated. By comparing the degree of match of the silhouette and the degree of match of the modified silhouettes it is possible to identify the best match silhouette. This is the silhouette that most closely matches the unique probability map and therefore the silhouette of the subject.

Once the best match silhouette is determined, further iterative steps may be undertaken to account for imaging factors present within the original one or more images of the subject. These imaging factors can include camera pitch; camera yaw, camera distance and barrel distortion.

Once the best match silhouette is obtained, the relative measurements of the best match silhouette can be calculated, based on a LOOKUP table of known three dimensional body images measurements. Finally, the best match silhouette can be scaled to the height of the subject, based on reference data provided by the subject, said reference data being one or more of: subject height; distance between subject and camera; reference to a calibrated known object. Alternatively, absolute measurements of the best match silhouette can be calculated, also based on a LOOKUP table of known three dimensional body image measurements.

In some embodiments, analysing the segments of the one or more images to determine the probability that the subject is located in the segment can comprise the step of comparing the location of pixels in the or each image with their corresponding locations on the probability maps to determine the probability that a pixel represents the subject in the image.

In some embodiments, the systems and methods described herein allow for compensation for variable line sharpness produced by uneven lighting conditions in the source images. This is achieved by blurring of the edges of the unique probability map generated by the above comparison to produce a boundary of uncertain pixels. Typically the edge regions identified above are the areas intentionally blurred. The blurring of the edges results in a probability gradient in the unique probability map from the background to the subject. The direction and strength of this gradient can then be identified and used to indicate the direction to the subject at each uncertain pixel with a vector line. Typically, the direction of this vector line is substantially perpendicular to the edge. From these gradients a vectored outline probability map can be generated, said map providing a direction vector (vector line) for each uncertain pixel (typically edge pixels) as to the expected direction of the subject relative thereto.

The vectored outline probability map can then be applied to the original image or images. By following the path indicated by the vectored outline probability map as applied to the original image, it is possible to determine the pixels in the original image that lie on each vector line with the highest contrast. These pixels represent the boundary pixels located on the edge of the subject, which separate the subject from the background of the image. The position of the boundary pixel provides a (crude) edge position of the subject. Additionally, comparing the colour and/or intensity of the boundary pixel with the colours and/or intensity of neighbouring pixels can enable an estimated true boundary for each boundary pixel to be ascertained with sub-pixel resolution. The estimated true boundary for each boundary pixel may be calculated using: $b=1-(c_B-c_A)/(c_C-c_A)$, where b is a sub-pixel adjustment value that is added to the (cruder) edge position of the boundary pixel already detected to determine the estimated true boundary of the subject, $c_B$ is the intensity of the current pixel, $c_A$ is the intensity of the previous pixel along the vector and $c_C$ is the intensity of the next pixel along the vector. Once the estimated true boundary has been determined, this can be applied to the corresponding location on the unique probability map to provide an estimated true boundary for each boundary pixel of the unique probability map.

Advantageously, the method of identifying the colour distribution may comprise: sampling pixels of the image to identify their colour; and mapping the location of the sampled pixels to the pre-rendered probability map to determine the expected colour of that region of the pre-rendered probability map. This allows the skin, clothing and background colours of the image to be learnt and accounted for. Typically the colour of the selected pixels is encoded within a generic RGB colour space, however other colour spaces such as the YCbCr family or sRGB can be used.

Additionally, identifying the colour distribution of the images allows a probability distribution of the colour of the pixels to be determined within at least one of the segments of the image. As required, said probability distribution can be generated within all segments of the image. Typically said probability distribution is generated within the colour space (RGB or other), although the image space (the x, y coordinates) can also be used. This allows a three dimensional (multivariate) probability distribution of the image to be created describing the colour distribution of the pixels of the image within all areas (segments) of the image. By comparing the generated probability distribution with the expected colour of corresponding regions of the pre-rendered probability map, it is then possible to determine the probability that a pixel represents the subject rather than the background.

Typically, the one or more unique probability maps representing the subject are generated by utilising the probability that a pixel represents the subject in the image in combination with the colour and/or spatial distributions generated from the weighted image, where the weighted image is itself generated from the probability that a pixel represents the subject in the image. This combination can be calculated to determine the unique probability that a pixel represents the subject using the formula:

$$p_{total} = p_{map}^{2^{5(0.5-p_{Inferred})}},$$

where $p_{total}$ is the unique probability that a pixel represents the subject, $p_{map}$ is the probability that a pixel represents a subject based on the pixels location in the image as compared to the pre-rendered probability map and $p_{Inferred}$ is the probability that the pixel lies within a portion of the image representing the subject rather than lying within the background of the images based on said distribution. Consequently, the calculation of the unique probability that each pixel represents the subject, allows the production of the unique probability map. This unique probability map provides an outline of the subject, where the regions determined to definitely be the subject have a probability close to 100%, the regions determined to be background (definitely not the subject) have a probability close to 0%, and edge regions have probabilities in-between. Typically, said unique probability maps have a resolution of 0.2 to 0.5 pixels.

In embodiments, the images can be converted into RGB images. This allows an easier determination of the colour distribution and also allows image artefacts to be readily identified and removed, such as those introduced by CCD image sensors. In embodiments, only selected body image data is generated, with areas of the subject discounted or discarded. Such exclusions may be undertaken by utilising probability maps that do not include areas of the subject, such as the head area. This can be advantageous as it allows features from the body image data that do not relate to actual body size, such as hair, to be excluded. Excluding these features prevents unnecessary resources from being used trying to include these in the above steps.

Furthermore, in embodiments the three dimensional body data of the subject can be outputted. The data can be output to one or more of a storage device, online cloud based storage, a mobile phone, a display screen or a personal computing device.

Referring to the figures, system 10 (FIG. 1) is provided with an input 'dumb' client system 20 and a server unit 30.

Figure 2:
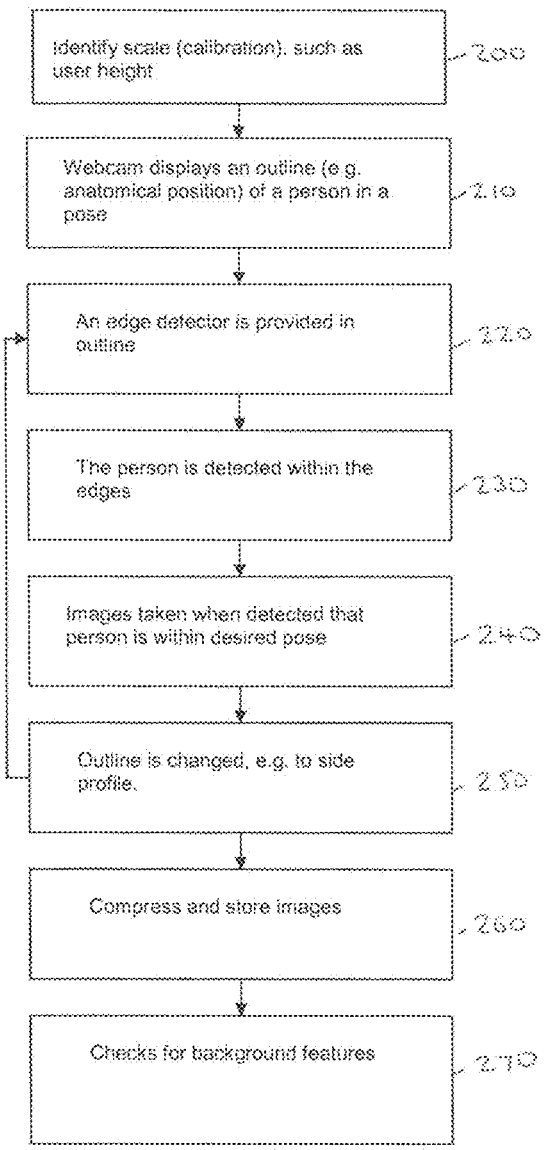
FIG. 2 is a flowchart of a process relating to data collection.
Figure 3:
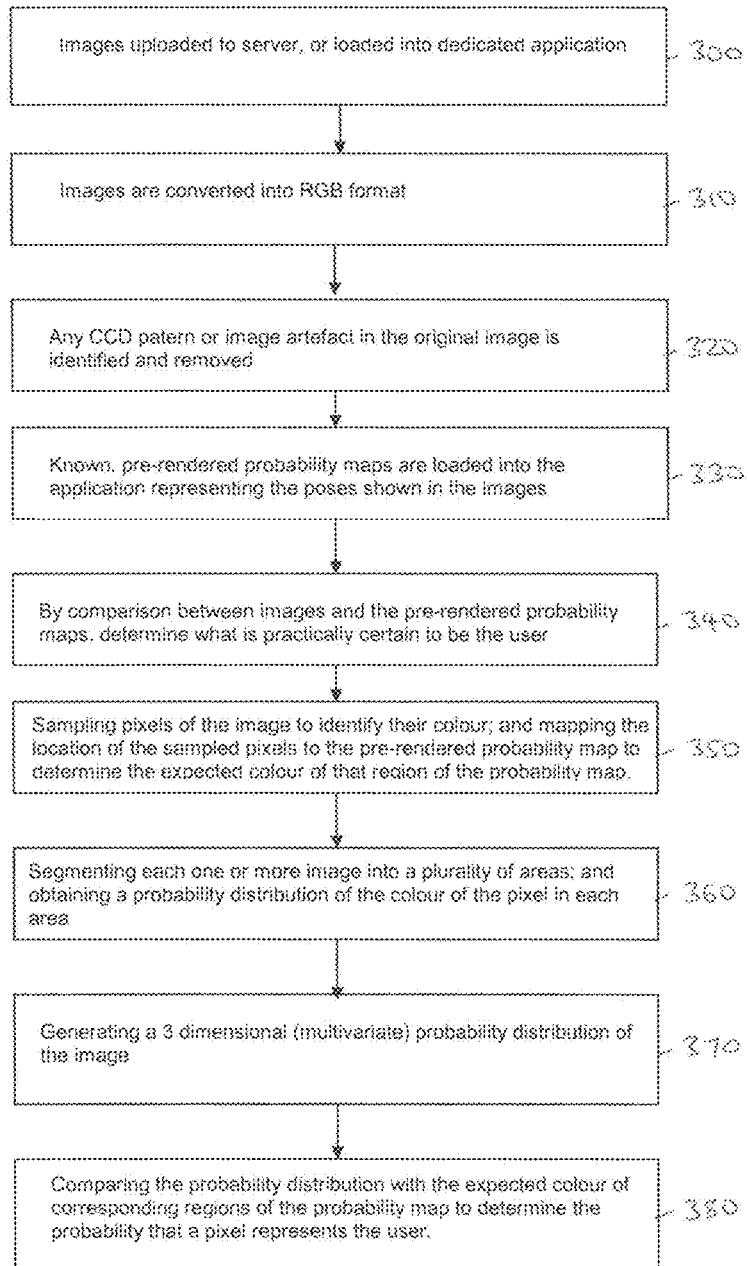
FIG. 3 is a flowchart of a process relating to position and colour probability calculation used in generating a unique probability map.
Figure 4:
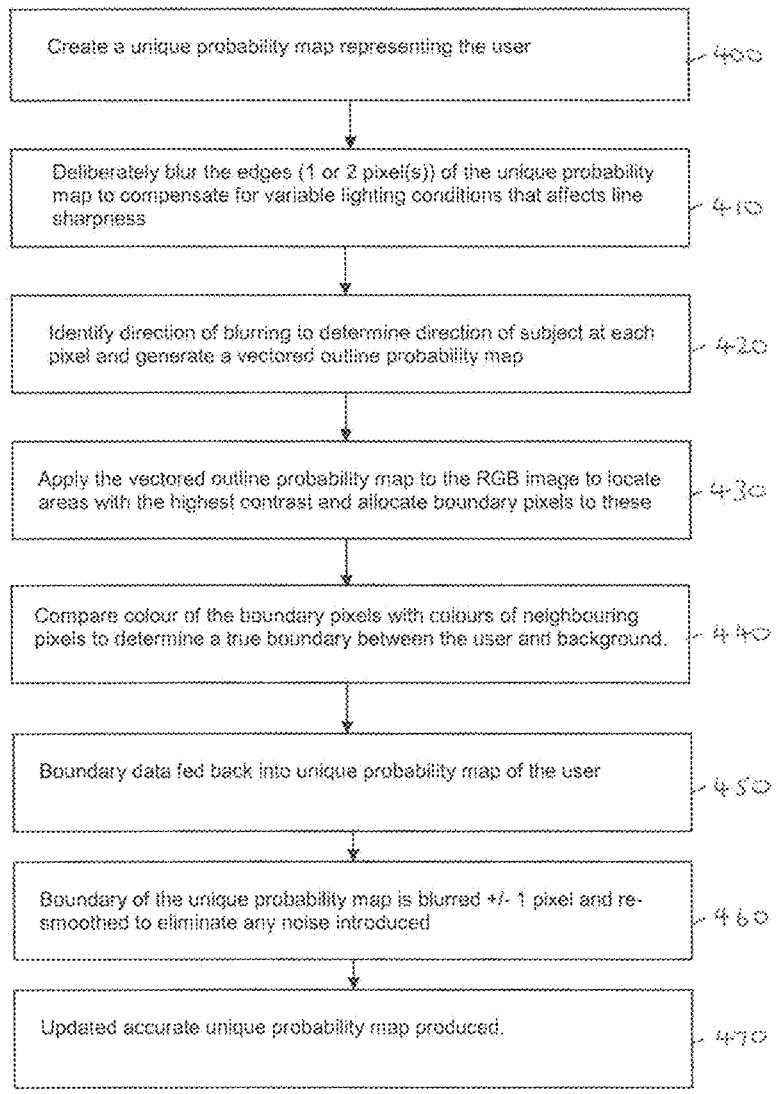
FIG. 4 is a flowchart of a process relating to improving the unique probability map.
Figure 5:
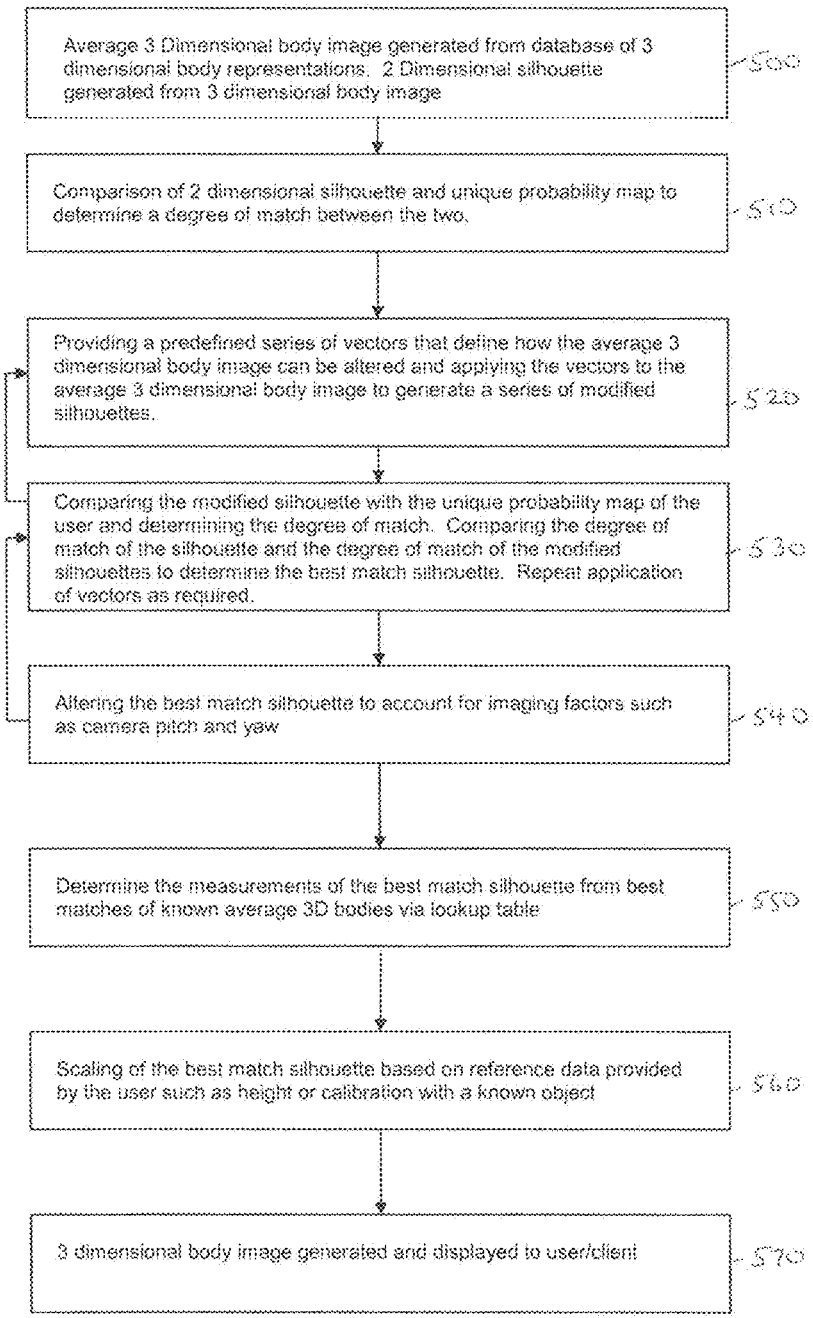
FIG. 5 is a flowchart of a process relating to generating a three dimensional body image based on the unique probability map and reference three dimensional body representations.

The client system 20 comprises a webcam 100 that is used to capture image information from a subject. In use, the webcam 100 is used in conjunction with a screen 120, such as a computer monitor, that displays a representation 110 of the subject. The software controlling the webcam 100, when the webcam is activated, issues a command to the screen 120 such that the screen 120 displays an outline 130 corresponding to a posed position 210 (FIG. 2). Typically the posed position required is face-on, with legs and arms spaced apart from the body—the anatomical position. Additionally, side profile positions (along the median plane) may also be requested 250.

When the representation 110 of the subject displayed on the screen crosses the edge of the outline 130 also displayed on the screen 120, the movement of the subject is detected 220 by the software controlling the webcam 100, 230. When the subject is ready, and the condition that the subject stand within the requested posed outline 130 is satisfied, the webcam 100 takes a sequence of images 150, 240 of the subject in the posed position. Once the requisite number of images has been collected, the images are compressed and stored for subsequent upload to the server unit 30, 260. It can be appreciated that the above steps may be repeated as many times as desired to generate a larger database of posed subject images. Furthermore, as an alternative to a webcam, mobile phone cameras may be used to capture the required images. In such case, the screen 120 and software to run the image capture and issue commands to the subject may be on the phone itself, using a dedicated application. It may also be appreciated that a conventional camera may be used for generating the images as well as other known image capture devices and software. Frames from video sources may also be used.

In addition to the capture of images, the client system 20 can request additional information 140 from the subject to assist the calibration and image identification process. As an example, calibration data to identify relative scales in the two dimensional images may be collected by requesting the height of the subject 200. Other options include asking the subject to hold a calibrated marker to the camera, such as a playing card. Further questions may assist in image processing, such as general amount of and/or colour of worn clothing.

Optionally, the client system 20 may also perform rudimentary checks on the taken and stored images 270. These checks may include analysing the images for background features and requesting that the subject move to a different area if too many background features are detected. Such analysis may also allow a further calibration between the relative height of the subject captured images as, if a common background feature is found, this can be used to ensure all the images of the subject are of a consistent height, to account for variable distance between the subject and the imaging device. Alternatively, or additionally, said analysis can remove common background features (to aid subsequent steps) or may require new images to be obtained if too many background features are detected.

Once images 150 have been captured by the client system 20, they are uploaded to the server unit 30, 300. The server unit 30 may be a subject's computer or smartphone or the like, although typically the server unit 30 is a dedicated off site server. The server comprises a database of known probability maps 160 corresponding to expected locations of the subject based on the posed positions that the subject was instructed to stand in 330. Alternatively, the pose of the subject may be determined using a feature tracking technique. A typical method of feature tracking utilises Lucas-Kanade Pyramids to calculate the optical flow of keypoints of the subject between images (or frames if applied to video). By taking a frame where the subject's position is known, key points in the image can be located (for example using corner detection techniques). Such points may be fingers, patterns on clothing, tattoos, skin blemishes etc.). A Lucas-Kanade Pyramid technique can then be used to follow these points between frames (or images). The points can be rechecked every few frames to prevent slippage. Such a technique allows the pose of the subject within images to be guessed more accurately and further allows the probability maps to be provided based on the determined pose. Such a pose determination technique increases the flexibility of the system and is particularly useful for determining the pose of subjects from video.

Initially, the server unit 30 analyses the incoming images and converts the image into an RGB image 310. Other compensatory filtering can be utilised at this point, such as detecting and removing patterns in the images introduced from CCD (Charge coupled device) sensors or the like, such as Active Pixel Sensors (APS) 320 and applying corrective barrel distortion or other imaging correction. From these filtered images, the server 30 then determines what is likely to be the representation of the subject 110, rather than the background or noise 340.

In order to determine the location of the subject within the image, the server 30 analyses the colour distribution within the RGB image to determine the relative colour weighting of the image. The colour weighting is then compared to the expected location of the subject according to the known probability map. For example, the server can weight the pixels in each image according to the per-pixel probabilities given by the associated probability maps to generate weighted images.

The colour distribution within the weighted images is then identified. As a result of this initial analysis, the server can determine the likely skin, clothing and background colours 350. It can be appreciated that factors other than colour could also be used, such as subject/object location and texture or spatial characteristics of the image such as the average of neighbouring pixels properties or textures (repeating patterns).

Once these likely skin, clothing and background colours have been indentified, the server 30 compares all the image pixels of the weighted image against these learnt likely colours and against the pre-rendered generic probability maps. This allows the server to generate a first estimate at the object's (subject) shape. From the distributions identified above, it is then possible to locate the probability that a pixel is associated with the subject and generate a unique probability map (see below) for each source image. Furthermore, the probability maps can further by used to tune the silhouette identified by aiding in the removal of background objects which may have been incorrectly identified. For example, the colour distribution analysis (above) may identify a colour (e.g. red) as representative of the subject, however if the background contains an identical colour, this will be identified as representative of the subject if based on the colour distribution alone. By combining the colour distribution with the probability map, such background features can be eliminated.

In particular, the server 30 generates a probability colour distribution for either the whole image, or for predefined segments within it (top quarter, middle, bottom quarter etc.) 360, 370. The probability distributions can then be combined with the probability determined from the pre-rendered probability map:

$$p_{total} = p_{map}^{2^{5(0.5-p_{Inferred})}},$$

where $p_{total}$ is the total probability that the pixel is a pixel associated with the body of the subject 110, $p_{map}$ is the probability that the pixel is a pixel associated with the body of the subject according to the expected location of the subject from the known pre-rendered probability map and $p_{Inferred}$ is the probability that the pixel lies within a portion of the image representing the subject rather than lying within the background of the images according to the relative colour distribution of the RGB image 380. It may be appreciated that the relative probability distributions can be combined using any suitable mathematical function depending upon the relative weight applied to the two probability distributions.

Through tailoring of $p_{total}$, pixel outliers can then be identified and discarded. It is then possible to apply the probability distributions across the whole image, or pre-defined segments within it, for each of the multiple received images. This generates a series of probability distributions (typically one distribution for every 10,000 pixels; corresponding to 100×100 pixel segments). Therefore, from the original image, a unique new probability map is created 400 by applying the collection of probability distributions to pixels within the images.

Once a first estimate of the subject's body shape has been determined, and a unique probability map created, the system undertakes a further step to compensate for variable lighting conditions in the source images that affect line sharpness. In order to compensate for this variable line sharpness, the system deliberately blurs the edges present within the probability map 410. This blurring is typically in the order of 1 or 2 pixels (in essence the line is anti-aliased).

By blurring the edges of the generated probability map, the system is aided in determining the direction of pixels in relation to the expected position of the subject 420. As the probability map is a high contrast greyscale image, the system can identify areas (of uncertain pixels) where the change of highest contrast occurs, and assign directionality to that change and those pixels. This direction is normal to the edges of the probability map and identifies the direction of the subject (the white of the probability map) at all pixels within the uncertain (blurred) edge points.

Once the directionality of an uncertain pixel is determined, this can be applied to the original RGB image to find areas (of pixels) with the highest contrast, i.e. where the gradient between neighbouring pixels is greatest 430. This determination allows the boundary of the subject in the RGB image to be determined accurately within a resolution of one pixel. Furthermore, improved, sub-pixel, resolution may be obtained by comparing the boundary pixel to neighbouring pixels to obtain an indication of the true boundary position 440. This may be achieved by determining the colour gradient between the boundary pixel and neighbouring pixel and assigning an estimated true boundary position at the point where the gradient is greatest. An indication of the true estimated boundary position is given by: $b=1-(c_B-c_A)/(c_C-c_A)$, where b is a sub-pixel adjustment value that is added to the (cruder) edge position of the boundary pixel already detected to determine the true estimated boundary, $c_B$ is the intensity of the current pixel, $c_A$ is the intensity of the previous pixel along the vector and $c_C$ is the intensity of the next pixel along the vector. This step represents an accurate inverse anti-aliasing step for two blocks of solid colour and therefore is especially useful for accounting for anti-aliasing introduced by CCD sensors.

Once the boundary has been determined in the RGB image, this information is then utilised in the probability map to provide an accurate representation of the edge of the generated probability map 450. Noise introduced by the edge identification process can be reduced by blurring the identified edge by +/−1 pixel and re-smoothing 460. The end result of this stage is a sequence of accurate, input-specific, probability maps 470, one per source 2 dimensional image.

With the sequence of accurate, input-specific, probability maps, it is now possible to perform a mapping of these probability maps to pre-calculated average body shapes to attempt to generate the final three-dimensional body shape of the subject. This is achieved by using a library of pre-calculated average body shapes and their extracted principle components (Eigenbodies) that are stored on the server as follows. An Eigenbody is similar to the known term Eigenface and is a representation of how a body relates to a library of pre-calculated average body shapes calculated using principle component analysis. For example, a body image may comprise of an average body shape plus 60% of Eigenbody 1, −12% of Eigenbody 2 and 18% of Eigenbody 3. This allows a mathematical representation of a body image to be stored without storing the image itself. Furthermore, the pose of the pre-calculated average body shapes can be selected or calculated to correspond to the pose of the subject as previously determined.

From a library of pre-calculated average body shapes, a series of 2-dimensional images (silhouettes) are generated or retrieved from the server from an average body shape or a series of disparate body shapes 500. These generated body shape silhouettes are downloaded to the server together with a predefined series of vectors that define how the average body shape silhouette changes (increases in hips leads to corresponding increase in bust etc.), which is represented by the relative percentages of the Eigenbodies. From the average body shapes, a comparison of the generated body shape silhouettes and the generated unique probability maps can be made to determine a degree of fit or match 510. The vectors are then applied to the average body shape to alter the relative percentage of the Eigenbodies and to generate a new modified body shape from which new silhouettes are calculated 520. These new silhouettes are then used to determine if a closer mapping can be generated from the vector altered (modified) body shape silhouettes 530. The vectors follow the principle components, but can also be in other directions based on previous changes. For example, if movement along a first axis results in an improved modified body shape silhouette, and movement in along a second axis also results in an improved modified silhouette, the next movement can be along the first and second axes simultaneously to reduce the overall number of steps necessary. This process is repeated until alteration of the body shape silhouettes by the vectors adversely affects the degree of match and a silhouette of best match found (the silhouette that most closely resembles the unique probability map). Such silhouette of best match is a silhouette from a combination of the average three dimensional body shape and the Eigenbodies (if the subject has a perfectly average three dimensional body shape, the relative percentage of the Eigenbodies will be zero). It can be appreciated that by tailoring the pose of the pre-calculated average body shape, the corresponding Eigenbodies also take the pose of the subject into account and allow for greater variation in posture and faster convergence with the unique probability map.

Once a silhouette of best match has been determined, the three dimensional body shapes are altered to account for other factors that are present within the original source images, namely camera pitch and yaw 540. A similar iterative process to that described above is performed at this step where changes are made to the three dimensional body shapes and compared to previous three dimensional body shapes to determine a best match.

When the iterative search is complete and a best match determined, the server can store the three dimensional body data according to its Eigenbody values. Measurements relating to the three dimensional body shape can be retrieved using a lookup table 550 based upon the average body shape and the Eigenbody values. Such measurements can include waist circumference, chest circumference etc. This lookup table is sourced from known empirical body dimensions generated from precise and accurate full body scanners, typically used in hospital environments. The calculated silhouette of best match can then be fed back into the pre-rendered probability maps, increasing the accuracy of the segmentation steps.

Once a true approximation of the three Dimensional body shape of the subject has been calculated, the body shape and the corresponding measurements can be scaled up to the subject's body shape by taking into account their entered height 560. Finally, the three dimensional scan body image and measurements can be displayed to the subject.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible program carrier for execution by, or to filter the operation of, data processing apparatus. Alternatively or in addition, the program instructions can be encoded on a propagated signal that is an artificially generated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A method of generating three dimensional body data of a subject; said method comprising:

receiving one or more images of the subject from a digital imaging device;

partitioning the one or more images into a plurality of segments;

analysing the segments of the one or more images to determine the probability that the subject is located in the segment;

identifying one or more distributions within the or each partitioned image, each distribution relating to a property of the one or more images;

utilising the probabilities and the distributions to produce one or more unique probability maps representing the subject, wherein utilising the probabilities comprises calculating the unique probability that a pixel represents the subject using the equation:

$$p_{total} = p_{map}^{2^{5(0.5-p_{Inferred})}}$$

where $p_{total}$ is the unique probability that a pixel represents the subject, $p_{map}$ is the probability that a pixel represents a subject and $p_{Inferred}$ is the probability that a pixel represents a subject as calculated from the distribution such that analysis of the unique probability for each pixel allows the production of the unique probability map;

comparing the one or more unique probability maps with a database of representations of three dimensional bodies to determine a best mapping between the or each unique probability map and a representation determined from the database; and generating three dimensional body data of the subject based on the best mapping.

2. The method of claim 1, wherein identifying one or more distributions within each partitioned image, each distribution relating to a property of the one or more images further comprises:

weighting pixels in the or each image according to the determined probability to generate a corresponding weighted image, and identifying a colour and/or spatial distribution within these weighted images.

3. The method of claim 1, further comprising:

providing one or more probability map(s) that identify the expected shape and pose of the subject in the one or more images.

4. The method of claim 1, further comprising:

determining the pose of the subject and providing one or more probability maps based on the determined pose.

5. The method of claim 1, wherein comparing the one or more unique probability maps with a database of three dimensional body representations to determine a best mapping comprises:

generating an average three dimensional body image from the database of three dimensional body representations;

generating at least one silhouette of the average three dimensional body image; and comparing the silhouette with the one or more unique probability maps of the subject and determining the degree of match.

6. The method of claim 5, further comprising:

providing a predefined series of vectors that define how the average three dimensional body image can be altered;

applying the predefined series of vectors to the average three dimensional body image to generate a modified three dimensional body image;

generating a modified silhouette of the modified three dimensional body image; and comparing the modified silhouette with the unique probability map of the subject and determining the degree of match.

7. The method of claim 6, further comprising:

comparing the degree of match of the silhouette and the degree of match of the modified silhouettes to determine the best match silhouette.

8. The method of claim 7, further comprising:

altering the best match silhouette to account for imaging factors present within the one or more images of the subject.

9. The method of claim 8, wherein the imaging factors present are at least one of:

camera pitch; camera yaw; camera distance and barrel distortion.

10. The method of claim 7, further comprising:

determining the relative measurements of the best match silhouette based on a LOOKUP table of known three dimensional body images measurements; and scaling the best match silhouette based on reference data provided by the subject, said reference data being one or more of: subject height; distance between subject and camera; reference to a calibrated known object.

11. The method of claim 3, wherein analysing the segments of the one or more images to determine the probability that the subject is located in the segment comprises:

comparing the location of pixels in the or each image with their corresponding locations on the probability maps to determine the probability that a pixel represents the subject in the image.

12. The method of claim 11, wherein a colour distribution is identified within the weighted images and identifying the colour distribution additionally comprises:

sampling pixels of the image to identify their colour; and mapping the location of the sampled pixels to the pre-rendered probability map to determine the expected colour of that region of the probability map.

13. The method of claim 12, wherein identifying the colour distribution further comprises:

obtaining a probability distribution of the colour of the pixels within all said segments of the image; and generating a three dimensional (multivariate) probability distribution of the image.

14. The method of claim 12, further comprising:

comparing the probability distribution with the expected colour of corresponding regions of the probability map to determine the probability that a pixel represents the subject.

15. The method of claim 1, further comprising:

converting each of the one or more images into an RGB image for identifying defects in the one or more images.

16. The method of claim 1, further comprising: outputting the three dimensional body data of the subject.

17. The method of claim 16, wherein the three dimensional body data is output to one or more of: a storage device; online cloud based storage; a mobile phone; a display screen; or a personal computing device.

18. A method of generating three dimensional body data of a subject; said method comprising:

receiving one or more images of the subject from a digital imaging device;

partitioning the one or more images into a plurality of segments;

analysing the segments of the one or more images to determine the probability that the subject is located in the segment;

identifying one or more distributions within the or each partitioned image, each distribution relating to a property of the one or more images;

utilising the probabilities and the distributions to produce one or more unique probability maps representing the subject;

blurring the edges of the one or more unique probability maps to compensate for variable line sharpness to produce a boundary of uncertain pixels;

identifying the gradient of the edges of the one or more unique probability maps to determine the direction of the subject at each uncertain pixel to produce a corresponding vectored outline probability map; and applying the vectored outline probability map to the image to determine points with the highest contrast; and identifying, at said point of highest contrast, a boundary pixel located on the edge of the subject;

comparing the colour of the boundary pixel with the colours of neighbouring pixels to determine from the intensities a true boundary position of the subject with sub-pixel resolution using: $b=1-(c_B-c_A)/(c_C-c_A)$, where b is an adjustment value added to the boundary pixel to determine the true boundary position of the subject, $c_B$ is the intensity of the current pixel, $c_A$ is the intensity of the previous pixel along the vector and $c_C$ is the intensity of the next pixel along the vector.

19. The method of claim 18, wherein identifying one or more distributions within each partitioned image, each distribution relating to a property of the one or more images further comprises:

weighting pixels in the or each image according to the determined probability to generate a corresponding weighted image, and identifying a colour and/or spatial distribution within these weighted images.

20. The method of claim 18, further comprising:

providing one or more probability map(s) that identify the expected shape and pose of the subject in the one or more images.

21. The method of claim 18, further comprising:

determining the pose of the subject and providing one or more probability maps based on the determined pose.

22. The method of claim 18, wherein comparing the one or more unique probability maps with a database of three dimensional body representations to determine a best mapping comprises:

generating an average three dimensional body image from the database of three dimensional body representations;

generating at least one silhouette of the average three dimensional body image; and comparing the silhouette with the one or more unique probability maps of the subject and determining the degree of match.

23. The method of claim 22, further comprising:

providing a predefined series of vectors that define how the average three dimensional body image can be altered;

applying the predefined series of vectors to the average three dimensional body image to generate a modified three dimensional body image;

generating a modified silhouette of the modified three dimensional body image; and comparing the modified silhouette with the unique probability map of the subject and determining the degree of match.

24. The method of claim 23, further comprising:

comparing the degree of match of the silhouette and the degree of match of the modified silhouettes to determine the best match silhouette.

25. The method of claim 24, further comprising:

altering the best match silhouette to account for imaging factors present within the one or more images of the subject, wherein the imaging factors present are at least one of: camera pitch; camera yaw; camera distance and barrel distortion.

26. The method of claim 24, further comprising:

determining the relative measurements of the best match silhouette based on a LOOKUP table of known three dimensional body images measurements; and scaling the best match silhouette based on reference data provided by the subject, said reference data being one or more of: subject height; distance between subject and camera; reference to a calibrated known object.

27. The method of claim 20, wherein analysing the segments of the one or more images to determine the probability that the subject is located in the segment comprises:

comparing the location of pixels in the or each image with their corresponding locations on the probability maps to determine the probability that a pixel represents the subject in the image.

28. The method of claim 25, wherein a colour distribution is identified within the weighted images and identifying the colour distribution additionally comprises:

sampling pixels of the image to identify their colour; and mapping the location of the sampled pixels to the pre-rendered probability map to determine the expected colour of that region of the probability map.

29. The method of claim 28, wherein identifying the colour distribution further comprises:

obtaining a probability distribution of the colour of the pixels within all said segments of the image; and generating a three dimensional (multivariate) probability distribution of the image.

30. The method of claim 29, further comprising:

comparing the probability distribution with the expected colour of corresponding regions of the probability map to determine the probability that a pixel represents the subject.

31. The method of claim 18, further comprising:

converting each of the one or more images into an RGB image for identifying defects in the one or more images.

* * * * *

UNITED STATES PATENT AND TRADEMARK OFFICE
CERTIFICATE OF CORRECTION

| | | |
|---|---|---|
| PATENT NO. | : 8,842,906 B2 | Page 1 of 1 |
| APPLICATION NO. | : 13/569504 | |
| DATED | : September 23, 2014 | |
| INVENTOR(S) | : Eleanor Watson et al. | |

It is certified that error appears in the above-identified patent and that said Letters Patent is hereby corrected as shown below:

On the Title page, Column 1, after (65) Prior Publication Date, insert item -- (30) Foreign Priority Application Ser. No. GB1209382.9 filed on 05/25/2012 --

In the Specification

Column 1, Line 8 (Approx.), delete "entirety" and insert -- entirety. --

In the Claims

Column 12, Line 59, Claim 1, delete "the or"

Column 13, Line 13, Claim 1, delete "the or"

Column 13, Line 23, Claim 2, delete "the or"

Column 14, Line 17, Claim 11, delete "the or"

Column 14, Line 57, Claim 18, delete "the or"

Column 15, Line 20, Claim 19, delete "the or"

Column 16, Line 25, Claim 27, delete "the or"

Signed and Sealed this
Tenth Day of February, 2015

Michelle K. Lee
*Deputy Director of the United States Patent and Trademark Office*